United States Patent
Heptia et al.

(10) Patent No.: US 11,161,741 B2
(45) Date of Patent: *Nov. 2, 2021

(54) METHOD FOR PRODUCING POLYPHOSPHORIC ACID AND DEVICE FOR SUCH A METHOD

(71) Applicant: Prayon, Engis (BE)

(72) Inventors: Bernard Heptia, Engis (BE); Carl Szocs, Engis (BE); Denis Leruth, Engis (BE); Damien Gabriel, Engis (BE)

(73) Assignee: PRAYON, Engis (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/043,014

(22) PCT Filed: Mar. 27, 2019

(86) PCT No.: PCT/EP2019/057702
§ 371 (c)(1),
(2) Date: Sep. 29, 2020

(87) PCT Pub. No.: WO2019/185698
PCT Pub. Date: Oct. 3, 2019

(65) Prior Publication Data
US 2021/0009419 A1    Jan. 14, 2021

(30) Foreign Application Priority Data

Mar. 30, 2018  (BE) .................................. 2018/5218
Dec. 20, 2018  (BE) .................................. 2018/5917

(51) Int. Cl.
*C01B 25/24*   (2006.01)
*B01J 8/02*    (2006.01)
(Continued)

(52) U.S. Cl.
CPC ............... *C01B 25/24* (2013.01); *B01J 8/02* (2013.01); *B01J 19/30* (2013.01); *B01J 6/00* (2013.01); *B01J 2219/00157* (2013.01)

(58) Field of Classification Search
CPC .............. C01B 25/24; B01J 8/02; B01J 19/30
See application file for complete search history.

(56) References Cited

U.S. PATENT DOCUMENTS 3,272,597 A   9/1966  Beltz et al.
3,671,202 A * 6/1972  Esterhoy ................. C01B 25/24
                                              423/317

(Continued)

FOREIGN PATENT DOCUMENTS

EP    1421030 B1    9/2010
EP    2411325 B1    4/2017

OTHER PUBLICATIONS

Int'l Search Report for PCT/EP2019/057702, dated Jun. 28, 2019.

*Primary Examiner* — David M Brunsman
(74) *Attorney, Agent, or Firm* — Blue Filament Law PLLC (57) ABSTRACT

A method and device for producing a solution of polyphosphoric acid from a feed solution P0 by the wet method is provided. An enriched phosphoric acid solution optionally mixed with a direct feed solution is pulverised in a flame of a combustion chamber in order to form the polyphosphoric acid solution. The combustion gases from the combustion chamber are placed in contact with the feed solution in a gas-acid contactor in order to increase the temperature and the $P_2O_5$ concentration thereof and thus to form an enriched phosphoric acid solution. A portion of the enriched phosphoric acid solution is conveyed with a flow rate of Qp into the combustion chamber in order to be pulverised in the flame. The rest of the enriched phosphoric acid solution is conveyed into a recirculation loop in order to be reinjected (Continued)

into the gas-acid contactor with a flow rate of Q2. The ratio of $Qp/(Qp+Q2)$ is controlled with a predefined value.

12 Claims, 3 Drawing Sheets

(51) Int. Cl.
 *B01J 19/30* (2006.01)
 *B01J 6/00* (2006.01)

(56) References Cited

U.S. PATENT DOCUMENTS

| | | | |
|---|---|---|---|
| 6,612,906 B2 * | 9/2003 | Benderly | B24B 1/04 |
| | | | 451/165 |
| 6,616,906 B2 | 9/2003 | Myers et al. | |
| 8,845,990 B2 * | 9/2014 | Germeau | B01J 8/025 |
| | | | 423/321.1 |
| 2003/0035768 A1 * | 2/2003 | Myers | C01B 25/24 |
| | | | 423/317 |

* cited by examiner

METHOD FOR PRODUCING POLYPHOSPHORIC ACID AND DEVICE FOR SUCH A METHOD

This application is a 371 filing of PCT/EP2019/057702, filed Mar. 27, 2019.

FIELD OF THE INVENTION

The present invention relates to a process and to a device for the production of polyphosphoric acid (=PPA) from phosphoric acid solutions. The process of the present invention is particularly effective and makes it possible, on the one hand, to produce PPA solutions at greater concentrations than those currently available on the market and, on the other hand, to lower the energy consumption necessary for the production of said polyphosphoric acid solutions with concentrations comparable to those currently available on the market. The present invention makes possible better management of the combustion gases produced by the process before their discharge to the atmosphere. Finally, the present invention makes it possible to produce a polyphosphoric acid solution of particularly high concentration.

TECHNOLOGICAL BACKGROUND

Polyphosphoric acid (=PPA) is a viscous liquid which can be produced in particular from phosphoric acid. It finds applications as dehydrating agent in the sector of fine chemistry or polymers, the pharmaceutical industry, the petrochemical industry or the manufacture of various chemicals. PPA has the general formula $HO[P(OH)(O)O]_nH$, with $n>1$. When $n=2$ the PPA is commonly known as pyrophosphoric acid; when $n=3$, the term employed is commonly tripolyphosphoric acid. For $n>3$, the term employed is simply polyphosphoric acid, independently of the value n. When $n=1$, the formula of orthophosphoric acid is encountered. PPA can in particular be produced by dehydration and polycondensation of orthophosphoric acid, $H_3PO_4$, according to the chemical equation (1). An aqueous polyphosphoric acid solution is thus obtained, the distribution by molecular weights of the entities of which depends, inter alia, on the polycondensation temperature (=Tpc).

(1)

Figure 1:
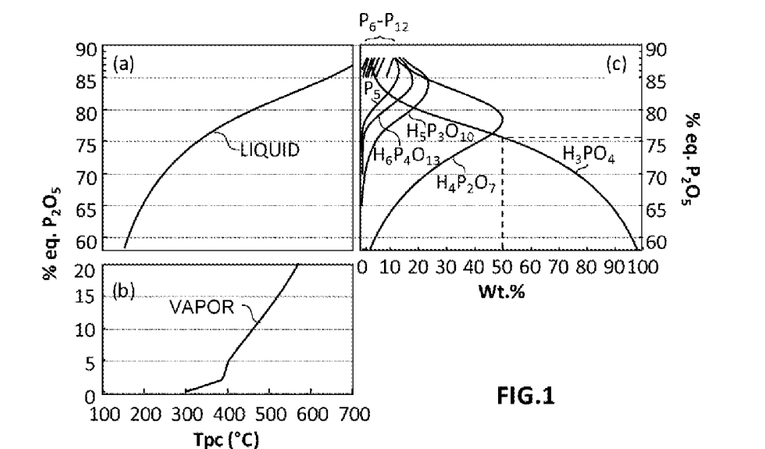
FIG. 1: graphically illustrates the relationship between the boiling point and the concentration of $P_2O_5$ at equilibrium of the liquid phase (part (a)) and of the vapor phase (part (b)), and also the relationship between the concentration of $P_2O_5$ and the distribution by weight of the molecular entities according to the different values of n (part (c)).

Polyphosphoric acid generally exists in the form of linear chains. Cyclic forms of metaphosphoric type, indeed even branched forms, can however also exist. As illustrated in FIG. 1, the polycondensation temperature determines the $H_3PO_4$ concentration at equilibrium in liquid state (FIG. 1(a)) and the latter determines the distribution by weight of the molecular entities, condensed or noncondensed, according to the different values of n (FIG. 1(c)). Thus, an aqueous phosphoric acid solution at a concentration of less than approximately 61% will have a fraction by weight very predominantly formed of $H_3PO_4$ molecules, that is to say virtually exclusively composed of $H_3PO_4$ (or $HO[P(OH)(O)O]_nH$ with $n=1$) molecules. When the concentration increases, the solution increasingly comprises polymerized molecules, the value of n increasing with the concentration as $P_2O_5$ equivalents, as shown in FIG. 1(c).

The dehydration and polycondensation of phosphoric acid to give polyphosphoric acid requires an evaporation of water molecules which necessitates the contribution of energy, generally calorific energy. The patent EP 2 411 325 B1 reviews a number of known processes for the production of polyphosphoric acid and describes a wet process, novel with respect to the processes reviewed, which makes it possible to benefit from great energy efficiency and to drastically limit the environmental impact. This patent describes a device resistant to the very severe operating conditions for the production of polyphosphoric acid, making it possible to limit the maintenance costs and to introduce durability of equipment and finally to ensure the production of a quality polyphosphoric acid devoid of contamination during the manufacturing process. The process described in patent EP 2 411 325 B1 comprises:

- a stage of spraying a feed solution P0 of the contactor into a flame located in an upper part of a combustion chamber in order to form a solution of polyphosphoric acid by polycondensation accompanied by formation of hot combustion gases,
- a stage of separation of the polyphosphoric acid solution and of the hot combustion gases, and
- optionally, a stage of bringing into contact, in a gas/acid contactor, the hot gases thus separated with the feed solution P0 of the contactor before the stage of spraying the solution into the flame.

Several advantages emerge from the stage of bringing into contact, in the gas/acid contactor, the hot gases with the feed solution P0 of the contactor. First of all, the feed solution P0 of the contactor is thus preheated and concentrated by evaporation of water from the solution before the stage of spraying into the flame, which considerably reduces the energy requirements during the polycondensation in the combustion chamber. Subsequently, the combustion gases can contain phosphoric acid droplets or vapors which, by exchange during the contact with the feed solution P0 of the contactor, make it possible to increase the concentration and to thus form an enriched phosphoric acid solution before the spraying stage. There is understood, by the term "enriched phosphoric acid solution", a phosphoric acid solution which comprises between 5% and 80% $P_2O_5$. Finally, the contacting stage contributes to the decrease in the temperature of the combustion gases before they are discharged.

The present invention constitutes an improvement to the process described in EP 2 411 325 B1; it maintains the advantages obtained by this process more substantially increasing the yield whilst decreasing energy consumption. Furthermore, the process of the present invention makes it possible to produce polyphosphoric acid solutions at concentrations and a purity never achieved to date, with concentrations much greater than 86% $P_2O_5$. The present invention and its advantages are described in more detail in the following sections.

SUMMARY OF THE INVENTION

The present invention is described in the appended independent claims. Preferred variants are defined in the dependent claims. In particular, the present invention relates to a process for the production of polyphosphoric acid P3 comprising the following stages:

(a) introducing, into a gas/acid contactor, a feed stream F0 of the contactor of a feed solution P0 of phosphoric acid which exhibits a concentration by weight, xp0, of between 0% and 70% $P_2O_5$, (b) introducing, into the gas/acid contactor, a recirculation stream F2 of recirculated enriched phosphoric acid solution P2, (c) introducing, into the gas/acid contactor, combustion gases G1, (d) bringing into contact the feed stream F0 of the contactor, the recirculation stream F2 and the combustion gases G1, in order to form, on the one hand,
an enriched phosphoric acid solution P1 comprising a concentration by weight, xp1, which is greater than xp0 (xp1>xp0) and, on the other hand,
contacted combustion gases G3, (e) separating the contacted combustion gases G3 from the enriched phosphoric acid solution P1, then
discharging the contacted combustion gases G3 from the gas/acid contactor and
taking the enriched phosphoric acid solution P1 out of the gas/acid contactor, (f) forming, from said enriched phosphoric acid solution P1, on the one hand,
a recirculation stream F2 of recirculated enriched phosphoric acid solution P2, in order to introduce it into the gas/acid contactor (1) as defined in stage (b) and, on the other hand,
a spray stream Fp of the enriched phosphoric acid solution P1, in order to introduce it into a combustion chamber, (g) spraying, through a burning flame in the upper part of the combustion chamber, a mixing stream Fm of a mixing solution Pm of phosphoric acid, having a concentration by weight xpm which is greater than that of the feed stream F0 of the contactor formed by, on the one hand,
the enriched phosphoric acid solution P1 and optionally, on the other hand,
a direct feed stream Fd of a direct aqueous feed solution Pd of phosphoric acid at a concentration by weight, xd, of at least 20%, preferably of at least 40%,
in order:
to evaporate water and thus to concentrate the mixing solution Pm,
to polymerize the molecules of the mixing solution Pm of phosphoric acid in order to form a polyphosphoric acid solution P3 and
to form combustion gases G1, (h) separating the polyphosphoric acid solution P3 from the combustion gases G1 and
recovering the polyphosphoric acid solution P3, and
transferring the combustion gases G1 into the gas/acid contactor (1) as defined in stage (c).

In a preferred variant of the invention, the feed solution P0 of the contactor comprises a concentration xp0 of at least 54%, preferably at least 58% or even at least 60% $P_2O_5$. The flow rate Q0 of the feed solution P0 of the contactor into the contactor, expressed per nominal power unit [$MW^{-1}$] of the combustion chamber, is preferably between 100 and 3000 kg/(h MW), preferably between 500 and 2500 kg/(h MW).

The enriched phosphoric acid solution P1 is identical to the recirculated phosphoric acid solution P2 and comprises a concentration xp1 preferably of between 5% and 80%, preferably at least 60%, more preferably at least 62% or even at least 65% $P_2O_5$. The total flow rate Q1=(Qp+Q2), of the solution P1 out of the contactor, expressed per nominal power unit [$MW^{-1}$] of the combustion chamber is preferably between 600 and 123 000 kg/(h MW), preferably between 1000 and 50 000 kg/(h MW). The ratio, Qp/(Qp+Q2), between the flow rate by weight Qp of the spray stream Fp and the total flow rate by weight (Qp+Q2) is preferably less than 50%, preferably less than 10%, preferably less than 5%, more preferably less than 2.5%, and in which the ratio Qp/(Qp+Q2) is greater than 0.1%, preferably greater than 0.5%.

The direct feed solution of phosphoric acid Pd can comprise a concentration xpd of 20% to 80%, preferably at least 60%, more preferably at least 62% or even at least 65% $P_2O_5$. The flow rate Qd of the direct feed solution Pd into the combustion chamber, expressed by nominal power unit [$MW^{-1}$] of the combustion chamber, is preferably between 0 and 1500 kg/(h MW), preferably between 400 and 1000 kg/(h MW).

In a variant of the invention, the feed solution P0 can comprise at least 40% $P_2O_5$, preferably at least 50% or at least 54%, more preferably at least 58% or even at least 60% $P_2O_5$.

In another variant of the invention, the feed solution P0 comprises less than 40% $P_2O_5$, preferably less than 30% or less than 20%, more preferably less than 5% or even 0% $P_2O_5$, and in which a flow rate Qd of the direct feed solution Pd is preferably nonzero.

The mixing solution Pm can comprise a concentration xpm of 15% to 80%, preferably at least 65%, more preferably at least 70% or even at least 75% of $P_2O_5$. The flow rate, Qd, of the direct feed solution Pd is preferably nonzero. The flow rate Qm of the mixing solution Pm in the combustion chamber, expressed by a nominal power unit [$MW^{-1}$] of the combustion chamber, is preferably between 600 and 3000 kg/(h MW), preferably between 900 and 2000 kg/(h MW).

The polyphosphoric acid solution P3 can comprise a concentration xp3 of at least 76 equivalent % of $P_2O_5$ units, preferably greater than 80%, particularly preferably greater than 88%, or is preferably between 76% and 90%, more preferably between 86% and 88%. The flow rate Q3 of the solution P3 of polyphosphoric acid in the combustion chamber, expressed per nominal power unit [$MW^{-1}$] of the combustion chamber, is preferably between 240 and 1500 kg/(h MW), preferably between 600 and 3000 kg/(h MW).

The feed stream F0 and the recirculation stream F2 can be either,
mixed before they are introduced into the gas/acid contactor, in order to form a stream of a mixture of the feed solution P0 of the contactor and of the recirculated enriched phosphoric acid solution P2, or
brought into contact after having been introduced separately into the gas/acid contactor, in order to form a stream of a mixture of the feed solution P0 of the contactor and of the recirculated enriched phosphoric acid solution P2.

Likewise, the direct feed stream Fd and the spray solution stream Fp are either,
mixed in order to form the mixing stream Fm before being sprayed into the flame in the combustion chamber, or
sprayed separately into the combustion chamber in order to form the mixing stream Fm in the flame or immediately before reaching the flame.

Contact between the feed stream F0 of the contactor and the recirculation stream F2 and the combustion gases G1 in stage (d) can be carried out co-currentwise or countercurrentwise, preferably co-currentwise, by flowing from an upper part toward a lower part of the gas/acid contactor.

During the contacting stage (d), the ratio (Qg1/(Q0+Q2)) between a flow rate by weight Qg1 of the combustion gas G1 introduced into the gas/acid contactor and a total flow rate by weight (Q0+Q2) of the contact feed stream F0 and of the recirculation feed stream F2 introduced into the gas/acid contactor is preferably between 0.1% and 50%, preferably between 0.5% and 10%, more preferably between 1% and 7%.

The present invention also related to a device for the production of polyphosphoric acid P3 according to a process as discussed above, comprising (A) a combustion chamber exhibiting:
an enriched phosphoric acid inlet in the combustion chamber, making possible the introduction at a flow rate of an enriched phosphoric acid solution P1 in the sprayed form into a combustion unit,
an inlet for direct feeding into the combustion chamber or upstream of the enriched phosphoric acid inlet, making possible the introduction of a direct feed solution Pd or of a mixture of direct feed solution Pd and of enriched phosphoric acid solution P1 in the sprayed form into a combustion unit,
the combustion unit being arranged in the upper part of the combustion chamber and being capable of forming a flame having a temperature of at least 1500° C. by combustion of a fuel, said combustion unit comprising:
a burner,
fluid connections between a burner and, on the one hand, the source of oxygen and, on the other hand, a source of fuel making it possible to feed the flame,
an outlet for polyphosphoric acid from the combustion chamber in order to recover a liquid phase, and arranged downstream of the combustion unit, which is itself arranged downstream of the enriched phosphoric acid inlet,
an outlet for a discharge of combustion gas G1 resulting from the flame, (B) a gas/acid contactor exhibiting
an inlet for contact feeding connected to a source of a feed solution P0 of the contactor, making possible the introduction at a contact feed flow rate Q0 of a feed solution P0 of the contactor,
an inlet for combustion gas making possible the introduction, into the gas/acid contactor, of the combustion gases G1 at a flow rate Qg1,
a recirculation inlet identical to or different from the contact feed inlet, making possible the introduction of a recirculated enriched phosphoric acid solution P2 at a recirculation flow rate,
the contact feed inlet and/or the recirculation inlet and the gas inlet being arranged in order to make possible, on the one hand,
contact between the contact feed stream F0 and the recirculation stream F2, in order to form a stream of a mixture of the feed solution P0 of the contactor and of the recirculated enriched phosphoric acid solution P2 and, on the other hand,
contact of the mixture thus formed with a combustion gases G1,
one or more outlets for enriched phosphoric acid, (C) a combustion gas fluid connection linking one end, coupled to the outlet for discharge of the combustion gases from the combustion chamber, to an end (6d) coupled to the inlet for combustion gases into the gas/acid contactor, (D) a first spray fluid connection linking an upstream end, coupled:
to the outlet for enriched phosphoric acid of the gas/acid contactor or
to a branch point with a first fluid connection which is coupled to the outlet for enriched phosphoric acid,
to a downstream end coupled to the enriched phosphoric acid inlet (2pu) into the combustion chamber,
characterized in that the device additionally comprises:
(E) a recirculation fluid connection (3, 3r) linking an upstream end, coupled,
to an outlet for recirculated enriched phosphoric acid (1pd) of the gas/acid contactor (1) or
to a branch point (5) with a first fluid connection (3), to a downstream end (3r) coupled,
to the recirculation inlet (1pru) of the gas/acid contactor (1) or
to a contact feed connection (3a) feeding the gas/acid contactor with feed solution P0 for the contactor, and
(F) means for controlling and maintaining a ratio, Qp/(Qp+Q2), between a spray flow rate by weight Qp, flowing in the spray fluid connection (3p), and a total flow rate by weight (Qp+Q2) defined as the sum of the spray flow rate by weight Qp and of a recirculation flow rate by weight Q2 flowing in the recirculation fluid connection (3r), at a value of less than 50%, preferably less than 10%, preferably less than 5%, more preferably of less than 2.5%, and in which the ratio Qp/(Qp+Q2) has a value of greater than 0.1%, preferably of greater than 0.5%.

BRIEF DESCRIPTION OF THE FIGURES

Different aspects of the present invention are illustrated in the following figures.

DETAILED DESCRIPTION OF THE INVENTION

FIGS. 2 to 5 illustrate the process and nonexhaustive variants of devices making it possible to carry out said process. In the continuation, the term "stream", represented by the letter "F", is used in its commonly accepted interpretation of flow of a fluid. Only FIG. 3 indicates the streams by the letter "F". The other figures illustrating devices show flow rates "Q" corresponding to the streams "F" of FIG. 3. The term "flow rate", represented by the letter "Q", characterizes the weight of the stream per unit of time and is expressed in [kg/s] or [kg/h]. The term "flow rate", even used alone, thus defines a flow rate by weight.

Conventions and Definitions

Unless otherwise mentioned in this patent, the term concentration is used to express concentrations by weight (percentages by weight, w/o). In order to define the content of the entity which mainly concerns us, when reference is made to concentration of the phosphoric acid solutions or others, the content by weight, expressed as units of $P_2O_5$ equivalents, which is written "% eq. $P_2O_5$" or also "% $P_2O_5$", should be understood. As regards the gas streams, such as, for example, the combustion gases, where several entities of interest may coexist depending on the operating conditions, in the gas or liquid form (for example by entrainment of droplets), indeed even possibly in the solid form (smoke), the concentration in these streams is also expressed as units of $P_2O_5$ equivalents (by weight, w/o). The ionic dissociation of the entities which interests us is not considered in this text. For information, the concentration of a phosphoric acid solution can also be sometimes expressed as units of $H_3PO_4$ equivalents. The correspondence between the two units of concentration is defined by the relationship: 1 eq. $P2O5=0.7245$ eq. $H_3PO_4$.

In this text, the following expressions are understood to mean:
- "phosphoric acid solution", an aqueous solution comprising $HO[P(OH)(O)O]_nH$, with $n \geq 1$;
- "orthophosphoric acid", an aqueous solution very predominantly comprising $HO[P(OH)(O)O]_nH$, with $n=1$, that is to say an aqueous phosphoric acid solution containing less than 61% by weight of $P_2O_5$;
- "polyphosphoric acid solution" (=PPA), an aqueous solution predominantly comprising $HO[P(OH)(O)O]_nH$, with $n>1$; that is to say an aqueous phosphoric acid solution containing more than 76% by weight of $P_2O_5$;
- "polycondensation of phosphoric or orthophosphoric acid", the polycondensation of the molecules under consideration as represented by the equations (1) and/or (2) below;
- "aqueous phosphorus-comprising solution", a solution comprising dissolved phosphorus in the form of entities of orthophosphate or polyphosphates type. According to the $P_2O_5$ content of these solutions, the ortho- or polyphosphate entities can be present as presented in FIG. 1(c). These entities can be present in the form of ions.

Process—Gas/Acid Contacts

The process of the present invention comprises the introduction, into a gas/acid contactor (1), of the following streams.
- a feed stream F0 of feed solution P0 of the contactor at a feed flow rate Q0. The feed solution P0 is an aqueous phosphoric acid solution at a concentration by weight xp0 of between 0% and 70% $P_2O_5$. In a variant of the present invention, the solution P0 is water. In this case, another source of phosphoric acid contained $P_2O_5$, called direct feed solution Pd, is necessary for the production of polyphosphoric acid P3; this production is discussed below in the section "Process—Polycondensation". In a variant of the present invention, the solution P0 is a phosphoric acid solution and comprises $P_2O_5$ (xp0>0). For example, the contact feed solution P0 can comprise a concentration xp0 of at least 40% $P_2O_5$, preferably of at least 50%, or even of at least 54% or of at least 58%, more preferably of at least 60% or even of at least 65% $P_2O_5$. The feed solution P0 generally comprises less than 62% $P_2O_5$ but higher concentrations of the feed solution do not in any way interfere with the process, in particular in the case of absence of a source of direct feed solution Pd of phosphoric acid (see the section "Process—Polycondensation"). A such concentrations, the feed solution P0 is formed mainly of orthophosphoric acid $H_3PO_4$ in aqueous solution (cf. FIG. 1(c)) but can contain condensed molecules (n>1).

The flow rate Q0 of the solution P0 in the contactor, expressed per nominal power unit [$MW^{-1}$] of the combustion chamber, is preferably between 100 and 3000 kg/(h MW), preferably between 500 and 2500 kg/(h MW).

A recirculation stream F2 of recirculated enriched phosphoric acid solution P2 which will be defined in detail later. The flow rate Q2 of the recirculated enriched phosphoric acid solution P2 in the contactor, expressed per nominal power unit [$MW^{-1}$] of the combustion chamber, can be between 300 and 120 000 kg/(h MW), preferably between 600 and 100 000 kg/(h MW), preferably between 9000 kg/(h MW) and 90 000 kg/(h MW). The recirculation stream F2 of recirculated enriched phosphoric acid solution P2 is the fruits of bringing a mixture of the feed stream F0 and of the recirculation stream F2 of recirculated enriched phosphoric acid solution P2 of a prior cycle into contact with a stream of combustion gases G1.

A stream of combustion gases G1 which was formed during the polycondensation of a mixing stream Fm of a mixing solution of phosphoric acid solution Pm comprising a concentration by weight xpm which is greater than that of the contact feed stream F0 in a combustion chamber; these two streams will be described and discussed in detail later. The stream of combustion gases G1 comprises varied phosphorus-containing molecules, in the form of droplets or vapors, carried along from the combustion chamber toward the gas/acid contactor. For example, the stream of combustion gases G1 can comprise between 0.5% and 40% $P_2O_5$.

The feed stream F0 and the recirculation stream F2 and the combustion gases G1 are thus brought into contact with one another in the gas/acid contactor (reference is thus made to a direct gas/acid contactor) in order to form, on the one hand, an enriched phosphoric acid solution P1 and, on the other hand, contacted combustion gases G3.

Figure 2:
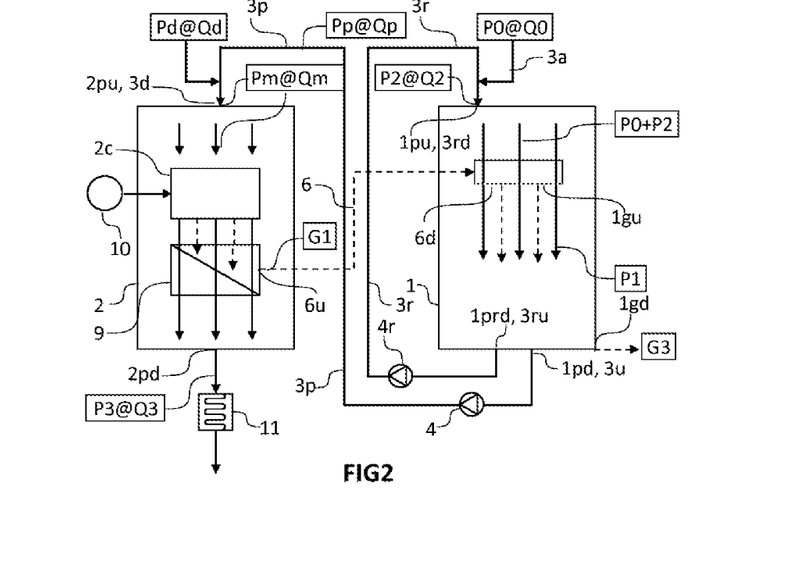
FIG. 2: illustrates a variant of device according to the present invention.
Figure 4:
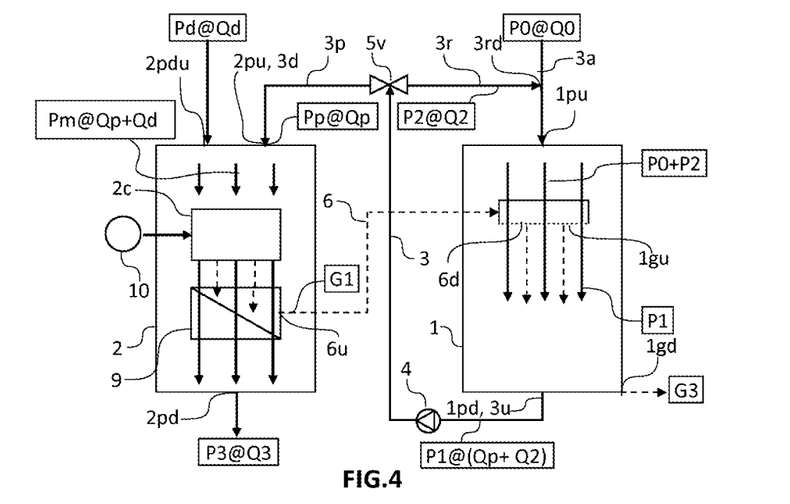
FIG. 4: illustrates a variant of device according to the present invention.

In a preferred variant, illustrated in FIGS. 2 and 4, the feed stream F0 and the recirculation stream F2 are mixed before they are introduced into the gas/acid contactor in order to form a stream of a mixture of the feed solution P0 of the contactor and of the recirculated enriched phosphoric acid solution P2. For this, it is sufficient to join up a recirculation pipe (3r) transporting the stream F2 and a feed pipe (3a) transporting the stream F0 upstream of an inlet (1pu) of the gas/acid contactor (1). The pressures in the recirculation pipe (3r) and the feed pipe (3a) have to be controlled in order to prevent liquid from flowing back in one of the two joined-up pipes. FIG. 2 shows a feed pipe (3a) joined to the recirculation pipe (3r), while FIG. 4 illustrates a recirculation pipe (3r) joined to a feed pipe (3a). In the two configurations, the combustion gases G1 are then brought into contact with the mixture of streams of solutions (F0+F2) thus formed after the introduction of the mixture into the gas/acid contactor (1).

Figure 3:
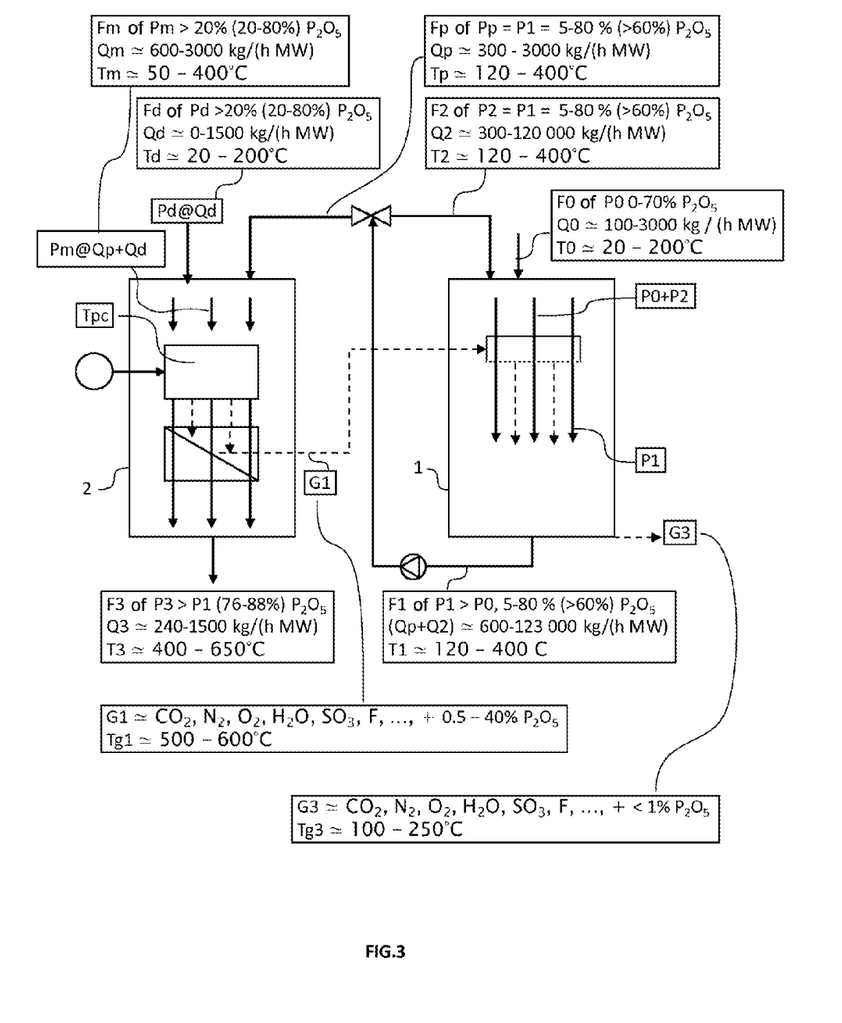
FIG. 3: gives values of a selection of parameters illustrative of the process according to the present invention.
Figure 5:
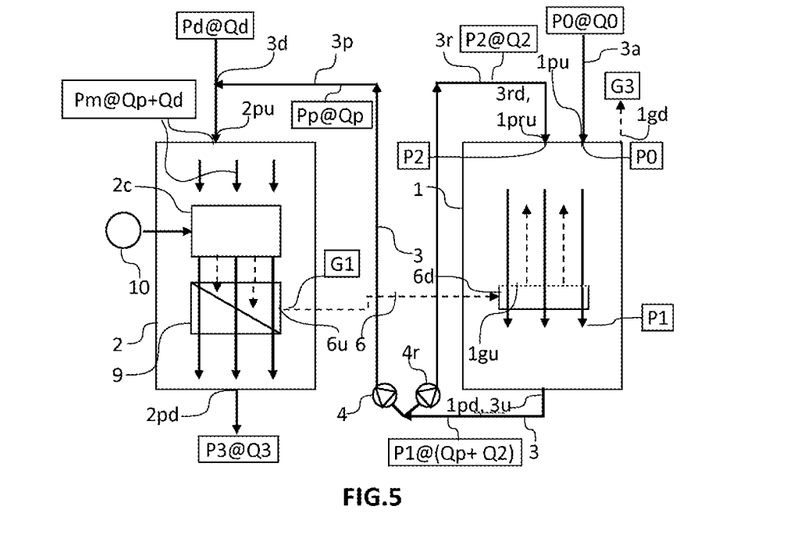
FIG. 5: illustrates a variant of device according to the present.

In an alternative variant, illustrated in FIGS. 3 and 5, the feed stream F0 and the recirculation stream F2 are brought into contact after having been introduced separately into the gas/acid contactor in order to form a stream of a mixture of the feed solution P0 of the contactor and of the recirculated enriched phosphoric acid solution P2. The streams of phosphoric acid F0 and F2 and of combustion gases G1 are thus all brought into contact in the gas/acid contactor. It is sufficient to provide, in the gas/acid contactor, an inlet ($1pu$) for feed stream F0 separated from an inlet ($1pru$) for recirculation stream F2.

Contact between the feed stream F0 and the recirculation stream F2 or their mixture (F0+F2) and the combustion gases G1 in the gas/acid contactor can be carried out by contact of streams co-currentwise or countercurrentwise. In particular, the liquid phases flow downward in a direction of gravity and the gas phase rises upward. In a preferred variant, the two or three streams flow cocurrentwise from an upper part toward a lower part of the gas/acid contactor. In the context of the present invention, the terms "upper" and "lower" are understood along the direction of the forces of terrestrial gravity, which extend in the direction of the center of gravity of the earth. Thus, in the absence of pressure gradients, a liquid naturally flows from the upper part of a reactor toward its lower part, which is found downstream of the upper part following the direction of terrestrial gravity.

It is possible to bring the combustion gases G1 into contact with the feed stream and the recirculation stream of phosphoric acid F0 and F2 or their mixture (F0+F2) by guiding the combustion gases in a stream transversal to those of the phosphoric acids. However, bringing into contact according to co-current streams is preferred.

Contact between the feed stream F0 and the recirculation stream F2 or their mixture (F0+F2) and the combustion gases G1 forms an enriched phosphoric acid solution P1 and contacted combustion gases G3. This contact can be carried out by causing the streams to percolate through a filling material which withstands the operating conditions. During contact between combustion gases G1 and the feed stream F0 and the recirculation stream F2, exchanges take place. On the one hand, the phosphorus-containing molecules transported by the combustion gases in the form of droplets and/or of vapor are carried along by the streams F0 and F2, making possible the formation of the enriched phosphoric acid solution P1 characterized by a $P_2O_5$ content which is greater than or equal to those of each of the streams F0 and F2. On the other hand, an exchanger feed takes place between the hot combustion gases, at a temperature Tg1 of the order 500 to 600° C., to the aqueous solutions of the streams F0 and F2, which are at lower temperatures, such as shown in FIG. 3. The contacted gases G3 are thus at a temperature Tg3<Tg1, facilitating their subsequent treatments for the purpose of their discharge to the atmosphere. At the same time, the enriched phosphoric acid solution P1 is at a temperature T1 greater than that of the mixture of the solutions P0 and P2; T1 is greater that the temperature T0 of the feed solution P0 (which can be of the order of 20 to 200° C.) and is substantially equal to the temperature T2 of the recirculated enriched phosphoric acid solution P2 since it is a matter of the same solution at two ends of the recirculation loop ($3r$).

The enriched phosphoric acid solution P1 and the contacted combustion gases G3, formed following the operation of bringing the feed stream and the recirculation stream of phosphoric acid F0 and F2 into contact with the combustion gases G1, are then separated by separation means well known to a person skilled in the art, such as a gravity separator or centrifuge, a coalescer, a mist eliminator, a mat, baffles, and the like. The contacted combustion gases G3 are then discharged from the gas/acid contactor (1) for subsequent treatments at a temperature substantially lower than that of the contacted combustion gases G3 introduced into said gas/acid contactor. As the majority of the phosphorus contained in the combustion gas stream G1 is transferred into the stream F1 of enriched phosphoric acid solution P1 during the contact of the stream G1 with the streams F0 and F2, the contacted gas stream G3 is much poorer in $P_2O_5$ than the combustion gas stream G1, with contents which can be lower than 1% $P_2O_5$.

The contacted combustion gases G3 can also be subjected to scrubbing, after their departure from the gas/acid contactor, with an aqueous scrubbing solution in order to dissolve and remove the undesirable compounds (for example fluorine, chlorine or sulfur compounds, and the like) before releasing the gases to the atmosphere. Other treatments of the contacted combustion gases G3 are possible, including, for example, the condensation of the gases in an indirect condenser. The enriched phosphoric acid solution P1 is also taken out of the gas/acid contactor, separately from the contacted combustion gases G3.

Process—Stream F1 and Division into Streams Fp and F2

The enriched phosphoric acid solution P1 can comprise a concentration xp1 of 5% to 80% $P_2O_5$, preferably at least 60%, more preferably at least 62% or even at least 65%. The concentration of the enriched phosphoric acid solution P1 depends, of course, on the concentration of the feed solution P0 and of the combustion gas stream G1. As discussed below, the concentration of the spray solution Pp is generally greater than that of the feed solution P0.

The enriched phosphoric acid solution P1 is divided into two separate streams before, during or after its discharge from the gas/acid contactor:
- a recirculation stream F2 of recirculated enriched phosphoric acid solution P2 in order to introduce it into the gas/acid contactor (1) through a recirculation loop ($3r$) in order to bring it into contact with the feed stream F0 and the combustion gases G1, as described above, and
- a spray stream Fp of a spray solution Pp in order to introduce it into a combustion chamber (2).

The spray solution Pp and the recirculated enriched phosphoric acid solution P2 are identical in composition together and identical to the enriched phosphoric acid solution P1 (P1=Pp=P2) since they have not been subjected to any detrimental change between the moment of their formation in the gas/acid contactor and the division into two separate streams, a recirculation stream F2 and a spray stream Fp. The temperatures, Tp, T2, of the solutions Pp and P2 are also substantially identical to the temperature T1 of the solution P1, which can be of the order of 120 to 400° C. The solutions Pp and P2 preferably comprise, under stationary conditions, a value of equivalents of $P_2O_5$ unit which is greater than that of the feed solution P0 of the contactor. This is explained by two main reasons.

First, bringing the feed stream and recirculation stream of phosphoric acid into contact with the combustion gases G1, which are at a higher temperature Tg1 of the order of 500 to 600° C. (cf. FIG. 3), results in the evaporation of a part of the water contained in the aqueous phase of the phosphoric acid solutions P0 and P2, which de facto increases the concentration of $P_2O_5$.

Secondly, as will be discussed later, the combustion gases G1 formed during the polycondensation inter alia of the spray stream Fp of spray solution Pp in the combustion chamber comprise $P_2O_5$ in the form of droplets or of vapors. The combustion gases G1 can comprise between 0.5% and 40% $P_2O_5$, preferably between 1% and 30%, preferably between 2% and 25%, or between 5% and 20% (cf. FIG. 3). During the contacting with the feed stream and recirculation stream of solution P0 and of recirculated enriched phosphoric acid solution P2, the majority of these molecules are transferred from the combustion gases to the mixture of solutions of acids (P0+P2). After contact, the contacted combustion gases G3 contain far fewer phosphorus-containing molecules than before contact, generally less than 0.1% $P_2O_5$ (cf. FIG. 3). By this transfer of molecules to the mixture of acids, the $P_2O_5$ concentration of the latter increases.

In a variant of the invention, the enriched phosphoric acid solution P1 is divided into two streams, the spray stream Fp and the recirculation stream F2, at the outlet of the gas/acid contactor into a spray fluid connection (3p) and into a recirculation fluid connection (3r), respectively, as illustrated in FIG. 2. Each of the fluid connections (3p) and (3r) is equipped with a pumping system (4, 4r) in order to provide the flow rates and a spray stream Fp at a spray flow rate Qp to a combustion chamber (2) and in order to entrain the recirculation stream F2 at a flow rate Q2 to the gas/acid contactor, thus forming a recirculation loop.

In an alternative variant, the enriched phosphoric acid solution P1 is taken out of the gas/acid contactor into a first fluid connection (3) or (3u) which is shared and is divided into two at a "T-shape" or "Y-shape" branch point (5) with, on the one hand, the spray fluid connection (3p), which entrains the spray stream Fp at a flow rate Qp to a combustion chamber (2), and, on the other hand, a recirculation fluid connection (3r), which entrains the recirculation stream F2 at a flow rate Q2 to the gas/acid contactor, thus forming a recirculation loop. Different variants of this configuration comprising a branch point (5) are illustrated in FIGS. 3 to 5. The spray flow rate Qp and the recirculation flow rate Q2 can be provided by one or more valves (cf. FIGS. 3 and 4), by pumps (4, 4r) on each of the branches of the branch point (5) (cf. FIG. 5) and/or by sections of spray pipe (3p) and the recirculation pipe (3r) proportioned in order to obtain the desired flow rates or by any other means well known and used industrially to distribute a stream between 2 feeds (for example, T-shaped or Y-shaped pipes with sets of regulated or unregulated valves).

The enriched phosphoric acid solution P1 exits from the contactor at a total flow rate Q1=(Qp+Q2). The total flow rate Q1, expressed per nominal power unit [$MW^{-1}$] of the combustion chamber, is preferably between 600 and 123 000 kg/(h MW) or between 1000 and 120 000 kg/(h MW), preferably between 12 000 and 100 000 kg/(h MW). As discussed above, the stream F1 of enriched phosphoric acid P1 is divided into two streams Fp and F2, each having a spray flow rate Qp and a recirculation flow rate Q2. The division into two streams can be carried out before the departure from the gas/acid contactor, at the departure from the latter, or after the departure. The spray flow rate Qp and the recirculation flow rate Q2 have to be determined as a function inter alia of the capacity of the combustion chamber and of the gas/acid contactor, of the temperature of the combustion gases G1 and their $P_2O_5$ content.

In a stationary production state, the ratio, Qp/(Qp+Q2), between the flow rate by weight Qp of the spray stream Fp and the total flow rate by weight (Qp+Q2) of the enriched phosphoric acid stream F1 (F1 is in fact the sum of the spray stream Fp and of the recirculation stream F2) is preferably less than 50%, preferably less than 20% and more preferably less than 10%. In a preferred variant of the invention, the ratio Qp/(Qp+Q2) is less than 5%, preferably less than 4%, more preferably less than 2.5% and even less than 2%. The ratio Qp/(Qp+Q2) is preferably greater than 0.1% or also greater than 0.2% and preferably greater than 0.5%. To increase the flow rate Q2 with respect to the flow rate Qp makes it possible, on the one hand, to cool the combustion gases G1 to a lower temperature, which is necessary before their discharge, and, on the other hand, to further enrich in $P_2O_5$ the enriched phosphoric acid solution Pp.

The ratio, Q2/(Qp+Q2), between the flow rate by weight Q2 of the recirculation stream F2 and the total flow rate by weight (Qp+Q2) is, of course, the complement of the ratio Qp/(Qp+Q2), the sum of which forms 100%. The recirculation flow rate Q2 is thus preferably greater than or equal to the spray flow rate Qp and, in some preferred variants, is considerably greater than Qp, with a ratio of flow rates Qp/Q2 which range from 0.1/99.9 to 49/51 (=0.1% to 96%). Preferably, the ratio of flow rates Qp/Q2 is between 1/99 and 5/95 (=1% to 5.3%).

As discussed above, the flow rate Q2 of the recirculated enriched phosphoric acid solution P2 in the contactor, expressed per nominal power unit [$MW^{-1}$] of the combustion chamber, can be between 300 and 120 000 kg/(h MW), preferably between 600 and 110 000 kg/(h MW), preferably between 9000 and 90 000 kg/(h MW). Thus, the flow rate Qp of the spray solution Pp flowing to the combustion chamber, expressed per nominal power unit [$MW^{-1}$] of the combustion chamber, can be between 300 and 3000 kg/(h MW), preferably between 600 and 2000 kg/(h MW), preferably between 1000 and 1500 kg/(h MW).

Process—Streams Fp, Fd and Fm

A mixing stream Fm of a mixing solution Pm having a concentration by weight xpm which is greater than that of the contact feed stream F0 is sprayed through a burning flame in the upper part of a combustion chamber (2) in order:
  to evaporate the water and to thus concentrate the mixing solution Pm,
  to obtain, by polymerization, polyphosphoric acid P3 and
  to form combustion gases G1.

The mixing stream Fm is formed at least by the spray stream Fp, which is introduced into the combustion chamber (2). In a preferred variant, the mixing stream Fm is formed, on the one hand, from the spray stream Fp and, on the other hand, from a direct feed stream Fd of a direct feed solution Pd of phosphoric acid.

In the variant comprising a direct feed stream Fd, the direct phosphoric acid feed solution Pd comprises a concentration xd of at least 20%, preferably of at least 40%. Preferably, the concentration xd is from 20% to 80%, preferably at least 60%, more preferably at least 62% or even at least 65% $P_2O_5$. The flow rate Qd of the direct feed solution Pd in the combustion chamber, expressed per nominal power unit [$MW^{-1}$] of the combustion chamber, is preferably between 0 and 1500 kg/(h MW), preferably between 100 and 1000 kg/(h MW), preferably between 400 and 700 kg/(h MW). A flow rate Qd=0 kg/(h MW) corresponds, of course, to the variant of the present invention not comprising direct feed stream Fd. The temperature of the direct feed solution Fd can be between 20 and 200° C., preferably between 40 and 150° C., more preferably between 50 and 100° C. A preheating of the solution Fd is advantageous in terms of effectiveness of the combustion of the mixing solution Fm in the flame.

In a stationary production state, the ratio, Qp/Q0, between the flow rate Qp of the spray stream Fp and the flow rate Q0 of the feed stream F0, is preferably between 100% and 250%, preferably between 101% and 140%, preferably between 110% and 115%. This ratio can be higher than 100% as the contact of the streams Q0 and Q2 with the combustion gases in the gas/liquid contactor increases the weight of the stream F1 exiting from the gas/liquid contactor. The value of this ratio can decrease if the value of the direct feed flow rate, Qd, increases.

The ratio of the flow rates Qd/(Qp+Qd) of the direct feed flow rate Qd to the sum of the spray flow rate Qp and of the direct feed flow rate Qd represents the fraction of flow rate of direct feed solution Pd entering the combustion chamber. The value of this ratio depends inter alia on the $P_2O_5$ content of the feed solution P0, which is determining for the $P_2O_5$ content of the spray solution Pp.

In the case where the feed solution P0 comprises at least 40% $P_2O_5$, preferably at least 50% or at least 54%, more preferably at least 58% or even at least 60% $P_2O_5$, the concentration of the spray solution is high and the ratio of flow rates Qd/(Qp+Qd) can be low, that is to say that the contribution of direct feed solution Pd can be low, indeed even zero. For example, the ratio Qd/(Qp+Qd) can be between 0% and 50%, preferably between 5% and 30% or between 10% and 20%.

In the case where the feed solution P0 comprises less than 40% $P_2O_5$, preferably less than 30% or less than 20%, more preferably less than 5%, or even 0% $P_2O_5$, the $P_2O_5$ concentration of the spray solution is low, indeed even zero. It can then be advantageous, indeed even necessary in the case of a content of 0% $P_2O_5$ (=water), to increase the concentration by weight of the mixing solution Pm by introducing, into the flame, the direct feed solution at a flow rate Qd. The ratio Qd/(Qp+Qd) is then preferably between 40% and 99%, more preferably between 50% and 90% or between 60% and 75%. It is preferable, if the contact feed solution P0 comprises a concentration xp0 of between 0% and 49%, preferably of between 1% and 45%, more preferably at most 40%, indeed even at most 20% or even at most 10% $P_2O_5$, for the direct feed flow rate Qd to then be preferably nonzero.

For a flow rate Qd>0, the direct feed stream Fd can be sprayed directly into the flame in order to form the mixing stream Fm directly in or upstream of the flame. Alternatively, the direct feed stream can be premixed with the spray stream Fp before introducing the mixture Fm of the two streams into the combustion chamber. In the first case, the combustion chamber would comprise a separate inlet for introducing the direct feed stream Fd. In the second case, the mixing between the spray stream Fp and the direct feed stream Fd would take place upstream of the inlet (2pu) for enriched phosphoric acid. The ratio of the flow rate of direct feed stream Fd introduced into the combustion chamber to the flow rate of feed stream F0 introduced into the contactor is as described above.

Independently of the value of the ratio Qd/(Qp+Qd), the mixing solution Pm preferably comprises a concentration xpm of 20% to 80%, preferably at least 40%, preferably at least 65%, more preferably at least 70% or even at least 75% $P_2O_5$. The flow rate Qm of the solution Pm in the combustion chamber is the sum of the spray flow rate Qp and of the direct feed flow rate Qd. Expressed per nominal power unit [$MW^{-1}$] of the combustion chamber, the flow rate of mixture Qm is preferably between 600 and 3000 kg/(h MW), preferably between 900 and 2000 kg/(h MW).

Process—Polycondensation

The combustion in the flame of the mixing solution Pm forms a polyphosphoric acid solution P3 by polycondensation of the phosphoric acid molecules contained in the solution Pm and forms combustion gases G1.

The temperature reached by the polyphosphoric acid solution P3 in the flame is an important parameter of the process since the $P_2O_5$ concentration obtained in this solution is dependent thereon, as is shown by the graph of FIG. 1(a). It is also important to keep the mixing solution Pm in contact with the flame and the combustion gases during a sufficient residence time at the polycondensation temperature Tpc required in order to obtain the expected $P_2O_5$ concentration and to ensure the conversion into polyphosphoric acid.

The flame is fed with a fuel and a source of oxygen, typically air or, for a greater temperature, oxygen. The flame is preferably a slightly oxidizing flame, preferably between 1% and 5% by volume of excess air, preferably between 2% and 3% by volume. The fuel is preferably natural gas, butane, propane or any other fuel, whether it is gaseous or liquid. In the absence of spraying of the mixing solution Pm, the flame preferably reaches a theoretical temperature of at least 1000° C., preferably at least 1500° C., more preferably at least 1700° C., for example 1800° C.±50° C. In the process of the present invention, the increase in temperature is instantaneously limited because, on the one hand, the mixing solution Pm is fed at a temperature Tm which is lower, of the order of 50-400° C., and, on the other hand, because the polycondensation reaction and the evaporation of the water molecules from the solution and formed during the polycondensation, are energy-consuming.

In the absence of a direct feed stream Fd (i.e., Qd=0), only the spray solution Pp is sprayed into the flame. If the direct feed flow rate Qd is nonzero, the direct feed stream Fd and the spray solution feed Fp can be mixed in order to form the mixing stream Fm, before being sprayed into the flame in the combustion chamber, as illustrated in FIGS. 2 and 5. Alternatively, the two streams can be sprayed separately into the combustion chamber in order to form the mixing stream Fm in the flame or immediately before reaching the flame, as illustrated in FIGS. 3 and 4.

It is preferable for the mixing solution sprayed into the flame to reach a polycondensation temperature Tpc of at least 400° C., preferably at least 500° C. and even greater than 550° C., indeed even of the order of 650° C. or 700° C., for a predefined polycondensation time. A high polycondensation temperature Tpc makes it possible to obtain polyphosphoric acid solutions having a high $P_2O_5$ concentration, of the order of 86% and more, equivalent in P2O5 units with longer chain lengths n (e.g., n 5 to 12) (cf. FIG. 1(c)). The temperatures necessary for the polycondensation of phosphoric acid require chemically and thermally resistant materials for the different elements of the reaction device. The mixing solution Pm, which comprises orthophosphoric acid molecules and polymer chains of polyphosphoric acid (of m+1 condensed units) undergoes a polycondensation reaction under the action of the temperature to release water and to form longer polymeric chains, according to the equation (1) described above and according to the chemical equation (2) (with m≥1 and r≥1):

(2)

The polyphosphoric acid solution P3 thus formed is then separated from the combustion gases G1 formed during the polycondensation of phosphoric acid in a gas/liquid separator (9). The polyphosphoric acid solution P3 is recovered, while the combustion gases G1 are transferred into the gas/acid contactor (1) in order to be brought into contact with the feed stream F0 and the recirculation stream F2, as described above.

The stream F3 of the polyphosphoric acid solution P3 thus recovered can have a high temperature of the order of 350 to 700° C., preferably 400 to 650° C., according to the polycondensation temperature Tpc used. It is preferable to cool the solution P3 in a heat exchanger (11) (cf. FIG. 2) to a temperature of the order of 100 to 200° C., for example between 110 and 150° C., preferably between 120 and 130° C., which makes possible a greater choice of materials for the tank for storage of the polyphosphoric acid thus formed and cooled, while keeping the solution in the liquid state.

The polyphosphoric acid P3 thus formed and recovered comprises a higher concentration than that of the mixing solution Pm. This is explained by the evaporation of a large part of the water from the solution during the passage of the latter through the flame. The concentration of the polyphosphoric acid solution P3 is generally greater than 76%, preferably greater than 80%, particularly preferably greater than 86%, or at least 87% and even at least 88%. It can, for example, be between 76% and 90%, preferably between 86% and 89% $P_2O_5$. $P_2O_5$ contents of greater than 86% by the wet route are rendered possible by virtue of the process of the present invention.

The flow rate Q3 of the polyphosphoric acid solution P3 in the combustion chamber is representative of the production capacity for polyphosphoric acid P3. Expressed per nominal power unit [$MW^{-1}$] of the combustion chamber, the flow rate Q3 is preferably between 240 and 1500 kg/(h MW), preferably between 500 and 1000 kg/(h MW).

The combustion gases G1 are in particular formed of phosphorus-containing molecules, it being possible for the latter to be present in amounts which can vary between 0.5% and 40% by weight of $P_2O_5$, generally between 0.5% and 35% by weight of $P_2O_5$, preferably between 1% and 30%, preferably between 2% and 25%, or between 5% and 20% by weight of $P_2O_5$. The temperature Tg1 of the transferred combustion gases G1 is substantially less than the temperature which the flame can reach because, as discussed above, the temperature in the combustion unit falls during the polycondensation reaction, which requires a great deal of energy, mainly in order to evaporate the water of the polycondensation reaction. The combustion gases enter the acid/gas contactor at a temperature Tg1 which is of the order of the polycondensation temperature Tpc and is generally between 400 and 700° C., preferably between 500 and 600° C.

Process—Recirculation Loop and Combustion Gases

As discussed above, a recirculation fraction of the enriched phosphoric acid solution P1 exiting from the gas/acid contactor (1) is reintroduced into the gas/acid contactor, thus forming a recirculation loop, while a spray fraction Pp is transported to the combustion chamber (2). The recirculation fraction is preferably greater than or equal to the spray fraction and is ideally considerably greater than the spray fraction, with ratios Qp/Q2 of the spray flow rate Qp to the recirculation flow rate Q2 which can range from 0.1/99.9 49/51 (=0.1 to 96%). Preferably, the ratio of flow rates Qp/Q2 is between 1/99 and 5/95 (=1 to 5.3%).

During their introduction into the gas/acid contactor, the feed stream F0 and the recirculation stream F2 can be mixed before their introduction into the gas/acid contactor in order to form a stream of a mixture of the contact feed solution P0 and of the recirculated enriched phosphoric acid solution P2, as illustrated in FIGS. 2 and 4. Alternatively, the streams F0 and F2 can be brought into contact after having been introduced separately into the gas/acid contactor in order to form a stream of a mixture of the contact feed solution P0 and of the recirculated enriched phosphoric acid solution P2, as illustrated in FIGS. 3 and 5.

The recirculation loop is the major distinctive element between the present invention and the process described in EP 2 411 325 B1. The main consequence of the introduction of such a recirculation loop is that the ratio (Qg1/(Q0+Q2)) of the flow rate by weight Qg1 of the combustion gas G1 introduced into the gas/acid contactor (1) to the total flow rate by weight (Q0+Q2) of the feed stream F0 and the recirculation stream F2 introduced into the gas/acid contactor (1) is much smaller than in the absence of such a recirculation loop. The ratio (Qg1/(Q0+Q2)) according to the present invention is preferably between 0.1% and 50%, more preferably between 0.5% and 20% or less than 10%, and is ideally between 1% and 7%. In a process according to EP 2 411 325 B1 comprising bringing the combustion gases into contact with the feed stream F0 (i.e., Qg1>0, Q0>0) but not recirculation stream F2 (i.e., Q2=0), the ratio (Qg1/Q0) is considerably greater, with values of greater than 60%, generally of greater than 100%, indicative of a greater combustion gas flow rate Qg1 than the feed flow rate Q0 of the contactor.

The recirculation loop thus makes it possible to control the ratio of the flow rates of combustion gas G1 to the total flow rate (Q0+Q2) of phosphoric acid feed solution P0 and of recirculated enriched phosphoric acid solution P2. In particular, it makes it possible to considerably increase the weight of phosphoric acid solution brought into contact with the combustion gas. This has several advantages.

First, the transfer of the phosphorus-containing molecules in droplets and/or vapors, contained in the combustion gases G1, to the stream of the mixture of the solutions P0 and P2 is much greater. The $P_2O_5$ concentration of the spray solution formed during the contact with the combustion gases is thus higher than if the ratio of flow rates Qg1/(Q0+Q2) were higher, as in EP 2 411 325 B1. The better gas/liquid contact thus obtained makes possible a better recovery by the enriched phosphoric acid solution P1 of the phosphorus contained in the combustion gases G1. Furthermore, the combustion gases G3, after the contact with the streams F0 and F2, are thus cleaned of their $P_2O_5$ content, simplifying their treatment before they are released to the atmosphere.

Secondly, with such ratios of flow rates, the temperature Tg3 of the combustion gases G3 after their contact with the streams F0 and F2 of phosphoric acid solutions is reduced much more effectively than in the process described in EP 2 411 325 B1, thus not requiring any other heat exchanger (or at least of reduced capacity), essential in the process of EP 2 411 325 B1 in order to bring the temperature of the combustion gases down to a value acceptable for their discharge to the atmosphere.

Device

The process of the present invention can be implemented in a device comprising a combustion chamber (2), a gas/acid contactor (1) and various fluid connections between the combustion chamber and the gas/acid contactor. It is clear that the device can comprise several combustion chambers and/or several gas/acid contactors positioned in parallel or in series.

Device—Combustion Chamber (2)

The combustion chamber (2) makes it possible to carry out the polycondensation of the mixing solution Pm by spraying the latter into the flame. The mixing solution Pm is formed of the spray solution Pp and, if appropriate, mixed with the direct feed solution Pd in order to form a polyphosphoric acid solution P3. The walls of the combustion chamber have to withstand the corrosive nature of the spray solution Pp and of the direct feed solution Pd and the high temperatures prevailing inside the chamber; it is preferable for the walls to be made of silicon carbide or of amorphous carbon. It is possible to use double walls with a neutral gas or their combustion gases circulating between the two walls, which can have advantages in terms of temperature of the walls, and impermeability of the latter to (poly)phosphoric acid solutions.

The combustion chamber (2) exhibits one or more spray inlet(s) (2pu) in the combustion chamber, making possible the introduction of a spray solution Pp at a flow rate Qp or of a mixing solution Pm at a flow rate (Qp+Qd), in the sprayed form in a combustion unit located in an upper part of the combustion chamber (cf. FIGS. 2 and 4). In a variant of the invention, the combustion chamber can comprise one or more direct feed inlet(s) (2pdu) making possible the introduction of a direct spray solution Pd at a flow rate Qd which is separate from the spray inlet(s) (2pu) (cf. FIGS. 3 and 5). A feed of inert gas, such as nitrogen, can be provided in order to optimize the spraying of the spray solution Pp and/or of the direct feed solution Pd and/or of the mixing solution Pm, which can have a significant viscosity at the inlet of the combustion chamber.

The combustion chamber (2) comprises a combustion unit (2c) arranged in the upper part of the combustion chamber and capable of forming a flame having a temperature of at least 1000° C., preferably at least 1500° C., and even at least 1700° C., preferably 1800° C.±50° C., by combustion of a fuel in the presence of oxygen. The temperature of the flame can be controlled by varying the flow rate of oxygen feeding the flame. The combustion unit comprises:

a burner,
fluid connections between the burner and, on the other hand, a source of oxygen and, on the other hand, a source of fuel (10) making it possible to feed the flame. Control of the ratio of the contribution of fuel to the contribution of oxygen to the burner makes it possible to control the temperature of the flame. Preferably, the fuel used is chosen from natural gas, methane, butane or propane. The source of oxygen is generally air or oxygen.

The combustion chamber (2) is equipped with a gas/liquid separator (9) in order to separate the polyphosphoric acid solution P3 thus formed from the combustion gases G1. For example, the combustion gases can be separated from the polyphosphoric acid solution by an expansion of the flow rate transverse surface area, the consequence of which is to decrease the rate of flow and thus the kinetic energy of the gas stream and polyphosphoric acid stream. As the streams flow from the top downward, the gases will slow down by the fall in their kinetic energy and can be deflected to a deflector which guides them to the outlet for the combustion gases. By virtue of their high density, the polyphosphoric acid droplets P3 continue their downward flow by gravity.

The combustion chamber (2) exhibits a polyphosphoric acid outlet (2pd) of the combustion chamber in order to recover a liquid phase, which is arranged downstream of the combustion unit, which is itself arranged downstream of the enriched phosphoric acid inlet (2pu) and the direct feed inlet (2pdu). The term "downstream" is expressed with respect to the direction of flow of the spray solution Pp and polyphosphoric acid solution P3 in the combustion chamber. As explained above, the direction of flow is preferably from the top downward following the direction of gravity. The device can thus be equipped with a storage tank for the polyphosphoric acid thus produced (not illustrated). Preferably, the device comprises a heat exchanger (11) arranged between the polyphosphoric acid outlet (2pd) and the storage tank, in order to cool the polyphosphoric acid solution from a temperature between approximately 350 and 650° C. to a temperature of the order of 100 to 150° C. when it reaches the storage tank.

Finally, the combustion chamber (2) is provided with an outlet for a discharge of combustion gases G1 resulting from the flame. These combustion gases have a temperature Tg1 of the order of the polycondensation temperature Tpc and do not need to be cooled before being introduced into the gas/acid contactor.

Device—Gas/Acid Contactor (2)

The gas/acid contactor (1) makes it possible to heat and to increase the $P_2O_5$ concentration of the feed solution of the contactor introduced into the contactor, before its entry into the combustion chamber (2), in order to optimize the yield and the energy consumption of the polycondensation reaction.

The gas/acid contactor (1) exhibits a feed inlet (1pu) connected to a source of a feed solution P0 of the contactor or of a mixture of feed solution P0 of the contactor and of enriched phosphoric acid solution P2. As discussed above, the feed solution P0 of the contactor comprises between 0% and 70% $P_2O_5$, at least 40%, preferably at least 50%, preferably at least 54%, more preferably at least 58% or even at least 60% $P_2O_5$. The feed inlet (1pu) has to be configured in order to make possible the introduction of the feed solution P0 of the contactor at a feed flow rate Q0 or the introduction of the mixture of feed solution P0 of the contactor and of recirculated enriched phosphoric acid solution P2 at a flow rate (Q0+Q2). The recirculated enriched phosphoric acid solution P2 can also be introduced in an inlet (1pru) for recirculated enriched phosphoric acid P2 which is separated from the feed inlet (1pu).

The gas/acid contactor (1) is preferably a direct contactor. It comprises a combustion gas inlet (1gu) which makes possible the introduction, into the gas/acid contactor, of the combustion gases G1 originating from the outlet for discharge of combustion gases G1. The feed inlet (1gu) has to be proportioned in order to make possible the introduction of the combustion gases G1 at a flow rate Qg1. As discussed above, the combustion gases G1 brought into contact with the feed solution P0 of the contactor make it possible (a) to increase the temperature of feed solution P0 of the contactor, (b) to evaporate a part of the water of the feed solution P0 of the contactor and (c) to exchange, with the solution P0, the $P_2O_5$ droplets and vapors contained in the combustion gas G1.

The gas/acid contactor (1) is provided with a recirculation inlet (1pru), making possible the introduction of a recirculated enriched phosphoric acid solution P2. In a variant of the invention, the streams F0 and F2 are mixed before being introduced into the gas/acid contactor and the recirculation inlet is then the same as the feed inlet (1pu). In an alternative variant, the feed inlet (1pu) and the recirculation inlet (1pru) are separate. The recirculation inlet has to be proportioned in order to make the introduction of the recirculated enriched phosphoric acid solution P2 at a feed flow rate Q2.

The gas inlet (1gu), the feed inlet (1pu) and, if it is separate from the latter, the recirculation inlet (1pru) are arranged in order to make possible, on the one hand, contact between the feed stream F0 and the recirculation stream F2, in order to form a stream (F0+F2) of a mixture (P0+P2) of the feed solution P0 of the contactor and of the recirculated enriched phosphoric acid solution P2, and, on the other hand, contact of the stream of the mixture thus formed with the stream of the combustion gases G1.

The gas inlet (1gu) is preferably arranged so that the combustion gases G1 (and denoted G2 during contact) flow co-currentwise with the feed stream F0 and the recirculation stream F2 of phosphoric acid solution. However, it is possible to arrange the gas inlet so that the combustion gases flow countercurrentwise to the streams F0 and F2.

The gas/acid contactor preferably comprises a filling material, through which the feed stream F0 and a recirculation stream F2 of phosphoric acid solutions percolate. The filling material is preferably positioned on a perforated support, for example a support grid.

The gas/acid contactor (1) comprises one or more enriched phosphoric acid outlets (1pd, 1prd); the enriched phosphoric acid outlet(s) (1pd, 1prd) are positioned downstream of the gas inlet (1gu), which is itself positioned downstream of the feed inlet (1pu) and, if it is separate from the latter, the recirculation inlet (1pru). The term "downstream" is expressed with respect to the direction of flow of the feed stream and of the recirculation stream of the phosphoric acid feed solution and of the recirculated enriched phosphoric acid solution P2 in the gas/acid contactor. The enriched phosphoric acid outlet(s) (1pd, 1prd) make it possible to take out the enriched phosphoric acid solution P1 formed in the gas/acid contactor formed by contact between the streams F0 and F2 and the combustion gases G1.

The gas/acid contactor (1) comprises a gas/liquid separator which makes it possible to separate the liquids from the gases after contact between the combustion gases G1 and the solutions P0 and P1. For example, the gas/acid contactor can comprise a demister which makes it possible to recover possible liquid droplets present in the contacted combustion gas G3 before its departure via the gas outlet (1gd).

The gas/acid contactor (1) also comprises a combustion gas outlet (1gd) which makes it possible to discharge, from the gas/acid contactor, the contacted combustion gases G3 after their contact with the mixture of the solutions P0 and P2. The device can be followed by a scrubbing tower for the contacted combustion gases G3 located downstream of the combustion gas outlet (1gd) of the gas/acid contactor, making it possible to remove possible undesirable compounds, such as, for example, fluorinated compounds or sulfur compounds, which the gases may contain, before releasing them to the atmosphere.

The device is equipped with a fluid connection (6) for combustion gases linking one end (6u), coupled to the discharge outlet for the combustion gases of the combustion chamber (2), to an end (6d), coupled to the combustion gas inlet (1gu) in the gas/acid contactor (1). The temperature in this fluid connection (6) should preferably be kept as high as possible in order for, at the inlet (1gu) in the gas/acid contactor, the combustion gases G1 to have a temperature as close as possible to the temperature Tg1 which they have at the outlet of the combustion chamber, i.e. approximately 500 to 600° C.

The device is equipped with a spray fluid connection (3p) linking an upstream end (3u), coupled to the enriched phosphoric acid outlet (1pd) of the gas/acid contactor (1), to a downstream end (3d), coupled to the enriched phosphoric acid inlet (2pu) of the combustion chamber (2). As the enriched phosphoric acid solution P1 has a temperature and a $P_2O_5$ concentration which are greater than those of the feed solution P0 of the contactor, the yield of the polycondensation in the combustion chamber is improved. As the transfer of phosphorus-containing molecules from the combustion gases G1 to the mixture of feed solution and of recirculation solution of phosphoric acid P0 and P2 is better than the transfer between the combustion gases G1 and the feed solution P0 of the contactor described in the device of EP 2 411 325 B1, the yield obtained with the device and the process of the present invention is greater than that obtained in EP 2 411 325 B1.

This improvement in transfer of phosphoric acid molecules and in yield of the polycondensation reaction is rendered possible by virtue of the recirculation loop making it possible to reintroduce, into the gas/acid contactor, a part of the stream of phosphoric acid solution P1 taken out of the same gas/acid contactor. Thus, the device additionally comprises a recirculation fluid connection (3r) linking an upstream end, coupled either to an outlet of recirculated enriched phosphoric acid solution (1prd) of the gas/acid contactor (1), or to a branch point (5v) with the first fluid connection (3), or to a branch point (4r) with the first fluid connection (3u), to a downstream end (3r), coupled to the recirculation inlet (1pru) or (1pu) of the gas/acid contactor.

The device is provided with means for controlling and maintaining a ratio, $Qp/(Qp+Q2)$, of a spray flow rate by weight Qp flowing in the first fluid connection (3) to a total flow rate by weight $(Qp+Q2)$, defined as the sum of the spray flow rate by weight Qp and of a recirculation flow rate by weight Q2 flowing in the recirculation fluid connection (3r), at a value of less than 50%, preferably less than 10%, preferably of less than 5%, more preferably of less than 2.5%, and in which the ratio $Qp/(Qp+Q2)$ has a value of greater than 0.1%, preferably of greater than 0.5%.

As illustrated in FIG. 2, the fluid connections (3p) and (3r) can be divided over their entire length between the gas/acid contactor and the combustion chamber with, on the one hand, the spray fluid connection (3p) linking a first enriched phosphoric acid outlet (1pd) to the enriched phosphoric acid inlet (2pu) in the combustion chamber and, on the other hand, the recirculation fluid connection (3r) linking a second enriched phosphoric acid outlet (1prd) to the recirculated enriched phosphoric acid inlet (1pu) of the gas/acid contactor or to the feed connection (3a) feeding the gas/acid contactor with feed solution P0 of the contactor, each of the spray fluid connection (3p) and the recirculation fluid connection (3r) being equipped with a pump (4, 4r) proportioned in order to maintain the ratio $Qp/(Qp+Q2)$ at a desired value or with a system for the transfer of fluids.

In an alternative variant illustrated in FIGS. 3 to 5, the gas/acid contactor is equipped with a single outlet (1pd) for enriched phosphoric acid P1 of the gas/acid contactor, which is coupled to a first fluid connection (3). The upstream parts of the spray fluid connection (3p) and the recirculation fluid connection (3r) are coupled to a branch point (5), thus forming, with the first fluid connection (3), a T-shaped or Y-shaped junction. In this variant, it is possible to use different means for controlling and maintaining the ratio $Qp/(Qp+Q2)$ at the desired value.

In a first variant illustrated in FIG. 5, the means for ensuring a ratio $Qp/(Qp+Q2)$ at the desired value comprise a pump (4) arranged on the spray fluid connection (3p) and having a pumping capacity for a liquid at a spray flow rate Qp and a recirculation pump (4r) arranged on the recirculation fluid connection (3r) and having a pumping capacity for a liquid at a recirculation flow rate Q2.

In a second variant illustrated in FIGS. 3 and 4, the means for ensuring a ratio Qp/(Qp+Q2) comprise a pump (4) arranged on the first fluid connection (3) upstream of the branch point (5) and having a pumping capacity for a liquid at a main flow rate (Qp+Q2) and one or more valves (5v) (for example, a three-way valve) arranged at the branch point (5) which make it possible to divide the main flow rate into a spray flow rate Qp to the spray fluid connection (3p) and into a recirculation flow rate Q2 to the recirculation fluid connection (3r).

In a third variant (not illustrated), the means for controlling the ratio Qp/(Qp+Q2) comprise a pump (4) arranged on the first fluid connection (3) upstream of the branch point (5) and having a pumping capacity for a liquid at a main flow rate (Qp+Q2) and conduits forming the spray fluid connection (3p) and the recirculation fluid connection (3r) proportioned so as to obtain the desired ratio Qp/(Qp+Q2). This solution is less flexible than the first two in that, once the conduits are proportioned, the ratio Qp/(Qp+Q2) cannot be easily varied, which is not necessarily a problem if the ratio should not vary during the lifetime of the device.

Polyphosphoric Acid Solution P3

The spraying of a mixing solution Pm obtained by the process of the present invention into a flame makes it possible to produce polyphosphoric acid solutions P3 which characteristics are unrivaled to date. By virtue of the high $P_2O_5$ content which the spray solution Pm suitable for the process of the present invention can have and by virtue of its high temperature at the moment of entry into the combustion chamber, polyphosphoric acid solutions with very high concentrations of $P_2O_5$ can be produced by the wet route, the value of which depends inter alia on the polycondensation temperature.

In the case where the polycondensation temperature, Tpc, of the spray solution Pp during the polycondensation reaction reaches at least 500° C., preferably at least 600° C. or at least 650° C., a polyphosphoric acid solution P3 never produced to date is obtained, in the form of a viscous liquid, comprising

- a $P_2O_5$ content of at least 86%, preferably at least 87%, more preferably at least 88%,
- a content of organic compounds, expressed in the form of Total Organic Carbon (=TOC), which is very low, less than or equal to 100 ppm, preferably less than or equal to 80 ppm, and
- an $SiO_2$ content which is also very low, less than or equal to 100 ppm, preferably less than or equal to 80 ppm.

Preferably, the polyphosphoric acid solution P3 of the present invention has an Fe content of less than or equal to 10 ppm, preferably of less than or equal to 5 ppm, an Sb content of less than or equal to 10 ppm, preferably of less than or equal to 5 ppm, and an $SO_4$ content of less than or equal to 11 ppm, preferably of less than or equal to 5 ppm. The contents of the different compounds above are expressed with respect to the polyphosphoric acid solution.

Implementation Example

A pilot device according to the present invention was constructed and tested. It comprises a gas/acid contactor (1) and a combustion chamber (2). The fluid connections comprise a spray fluid connection (3p) completely separate from and independent of the recirculation connection (3r), as illustrated in FIG. 2. Each of the spray fluid connection (3p) and the recirculation fluid connection (3r) is equipped with a pump (4, 4r) making it possible to control and keep constant the ratio of flow rates Qp/(Qp+Q2) at different values between 0.75% and 6.7%. The combustion unit is connected to a source of natural gas and to a feed of air, the flow rates of which can be controlled in order to control the temperature of the flame. The combustion chamber is provided with a direct feed inlet (2mu), as illustrated in FIG. 4.

The ranges of $P_2O_5$ concentrations, flow rates and temperatures of the different phosphoric acid streams P0 to P3 and of combustion gases G1 and G3 tested with the pilot device are shown in table 1. The positions of said streams in a device according to the present invention are shown in FIG. 3. The polycondensation temperature Tpc was between 400 and 650° C.

TABLE 1

Ranges of compositions, flow rates and temperatures of the different streams with Qd = 0

| Stream | Fluid | Concentration (% $P_2O_5$) | Q (kg/h) | T (° C.) |
|---|---|---|---|---|
| F0 | P0 (liq) | >40% $P_2O_5$ | Q0 = 105-445 | T0 = 20-100 |
| Fp | P1 (liq) | >62% (>70%) $P_2O_5$ | Qp = 150-400 | T1 = 200-300 |
| F2 | P2 (liq) | >62% (>70%) $P_2O_5$ | Q2 = 1000-20 000 | T2 = 200-300 |
| Fd | Pd (liq) | 0 | Qd = 0 | Td = NA |
| Gas | G1 (gas) | 0.5%-10% $P_2O_5$ | Qg1 = 200-400 | Tg1 = 500-600 |
| F3 | P3 (liq) | >76% (>86%) $P_2O_5$ | Q3 = 150-250 | T3 = 400-650 |
| Gas | G3 (gas) | <1% $P_2O_5$ | Qg3 = 200-400 | Tg3 = 50-100 |

It can be seen, in table 1, that, with a feed solution P0 comprising 62% $P_2O_5$ and a polycondensation temperature Tpc=630° C., a polyphosphoric acid solution P3 comprising 88% $P_2O_5$ was produced with the pilot device by applying a ration of flow rates Qp/(Qp+Q2)=1%.

A series of ranges of values of the different parameters appropriate for the implementation of the process of the present invention is listed in table 2.

TABLE 2

Examples of values of parameters appropriate to the process of the present invention

| | Ti ° C. | | xpi % [$P_2O_5$] | | Qi kg/(h MW) | |
|---|---|---|---|---|---|---|
| | min | max | min | max | min | max |
| F0 | 20 | 100 | 0% | 70% | 100 | 3000 |
| F1 | 200 | 300 | 5% | 80% | 600 | 123 000 |
| F2 | 200 | 300 | 5% | 80% | 300 | 120 000 |
| Fp | 200 | 300 | 5% | 80% | 300 | 3000 |
| Fd | 50 | 200 | 20% | 80% | 0 | 1500 |
| Fm | 20 | 300 | 20% | 80% | 600 | 3000 |

TABLE 2-continued

Examples of values of parameters appropriate to the process of the present invention

| | Ti °C. | | xpi % [$P_2O_5$] | | Qi kg/(h MW) | |
|---|---|---|---|---|---|---|
| | min | max | min | max | min | max |
| F3 | 350 | 700 | 76% | 88% | 240 | 1500 |
| G1 | 500 | 600 | 0.5% | 5% | — | — |
| G3 | 100 | 250 | 0% | 1% | — | — |

| # | Characteristic |
|---|---|
| 1 | Gas/acid contactor |
| 1gd | Combustion gas outlet of the gas/acid contactor |
| 1gu | Combustion gas inlet in the gas/acid contactor |
| 1pd | Outlet for enriched phosphoric acid solution, P1, of the gas/acid contactor |
| 1pu | Feed inlet for the contact solution, P0, or for mixture (P0 + P2) in the gas/acid contactor |
| 1pru | Inlet for recirculation enriched phosphoric acid, P2, in the gas/acid contactor (optional) |
| 2 | Combustion chamber |
| 2c | Combustion unit |
| 2pd | Outlet for polyphosphoric acid, P3, of the combustion chamber |
| 2pdu | Inlet for direct feed solution, Pd, in the combustion chamber |
| 2pu | Inlet for spray acid solution, Pp, in the combustion chamber or combined inlet for the direct feed stream and the spray stream |
| 3 | First fluid connection |
| 3a | Feed fluid connection |
| 3d | Downstream end of the first fluid connection (3) or of the spray fluid connection (3p) |
| 3p | Spray fluid connection |
| 3r | Fluid connection for recirculation to the gas/liquid contactor (1) |
| 3rd | Downstream end of the recirculation fluid connection (3r) |
| 3u | Upstream end of the spray fluid connection (3p) or of the first fluid connection (3) |
| 4 | Pump |
| 4r | Recirculation pump |
| 5v | Valve or set of valves (for example, three-way valve) |
| 6 | Combustion gas fluid connection |
| 6d | Outlet of the combustion gas connection |
| 6u | Inlet of the combustion gas connection |
| 10 | Source of fuel for the combustion unit (10) |
| 11 | Heat exchanger |
| Fp | Spray stream of enriched polyphosphoric acid solution |
| F2 | Recirculation stream of recirculated enriched phosphoric acid solution |
| F3 | Stream of polyphosphoric acid solution |
| Fd | Direct feed stream of direct feed solution Pd |
| Fp | Spray stream of enriched phosphoric acid solution |
| Fm | Mixing stream of mixing solution Fm (=Fd + Fp) |
| G1 | Combustion gases |
| G3 | Contacted combustion gases |
| P0 | Feed solution of the contactor |
| P0 + P2 | Mixture of the feed solution P0 of the contactor and of the recirculated enriched phosphoric acid solution (P2) |
| P1 | Enriched phosphoric acid solution |
| P2 | Recirculated enriched phosphoric acid solution |
| P3 | Polyphosphoric acid |
| Pd | Direct feed solution |
| Pp | Spray solution |
| Pm | Mixing solution (=Pd + Pp) |
| Q0 | Feed flow rate of the feed solution P0 of the contactor |
| Q1 | Flow rate of enriched phosphoric acid at the outlet of the contactor (=Q2 + Qp) |
| Q2 | Recirculation flow rate of the recirculated enriched phosphoric acid solution |
| Q3 | Flow rate of the polyphosphoric acid |
| Qg1 | Flow rate of the combustion gases to the gas/acid contactor (1) |
| Qg2 | Flow rate of the combustion gases in the gas/acid contactor (1) |
| Qd | Flow rate of the direct feed solution Pd |
| Qp | Spray flow rate of the spray solution Pp |
| Qm | Flow rate of the mixing solution Pm |
| Gg3 | Flow rate of the contacted combustion gases outside the gas/acid contactor (1) |
| T0 | Temperature of the feed solution P0 of the contactor |
| T1 | Temperature of the enriched phosphoric solution P1 |
| T2 | Temperature of the recirculated enriched phosphoric acid solution P2 |
| T3 | Temperature of the polyphosphoric acid solution P3 |
| Tg1 | Temperature of the combustion gases G1 |
| Tg3 | Temperature of the contacted combustion gases G3 |

The invention claimed is:

1. A process for the production of polyphosphoric acid comprising:

(a) introducing, into a gas/acid contactor a feed stream of the contactor of a feed solution of phosphoric acid which exhibits a concentration by weight, xp0, of $P_2O_5$ present in an amount of up to and including 70%;

(b) introducing, into the gas/acid contactor a recirculation stream of recirculated enriched phosphoric acid solution;

(c) introducing, into the gas/acid contactor combustion gases;

(d) bringing into contact the feed stream of the contactor, the recirculation stream and the combustion gases, in order to form, an enriched phosphoric acid solution comprising a concentration by weight, xp1, which is greater than xp0 and, contacted combustion gases;

(e) separating the contacted combustion gases from the enriched phosphoric acid solution, then discharging the contacted combustion gases from the gas/acid contactor and taking the enriched phosphoric acid solution out of the gas/acid contactor;

(f) forming, from said enriched phosphoric acid solution, the recirculation stream of recirculated enriched phosphoric acid solution, in order to introduce the recirculation stream into the gas/acid contactor as defined in stage (b) and, a spray stream of the enriched phosphoric acid solution, in order to introduce it into a combustion chamber;

(g) spraying, through a burning flame in the upper part of the combustion chamber, a mixing stream of a mixing solution of phosphoric acid, having a concentration by weight, xpm, which is greater than that of the feed stream of the contactor formed by one of:

the enriched phosphoric acid solution; or a direct feed stream of a direct aqueous feed solution of phosphoric acid at a concentration by weight, xd, of at least 20%, in order:

to evaporate water and thus to concentrate the mixing solution, to polymerize the molecules of the mixing solution of phosphoric acid in order to form a polyphosphoric acid solution, and to form the combustion gases;

(h) separating the polyphosphoric acid solution from the combustion gases, and
recovering the polyphosphoric acid solution, and transferring the combustion gases into the gas/acid contactor as defined in stage (c).

2. The process as claimed in claim 1, in which:
the feed solution has a flow rate, Q0, in the contactor, expressed per power unit of the combustion chamber, which is between 100 and 3000 kg/(h MW).

3. The process as claimed in claim 1, in which:
the enriched phosphoric acid solution is the recirculated phosphoric acid solution and comprises a concentration by weight, xp1, of 5% to 80% $P_2O_5$, and in which
a total flow rate, Q1=(Qp+Q2), of the enriched phosphoric acid solution outside the contactor, per power unit of the combustion chamber, is between 600 and 123 000 kg/(h MW), and
a ratio, Qp/(Qp+Q2), of the flow rate by weight, Qp, of the spray stream to the total flow rate by weight (Qp+Q2), is less than 50%, where Q2 is the flow rate of the recirculated phosphoric acid solution, and in which the ratio Qp/(Qp+Q2) is greater than 0.1%.

4. The process as claimed in claim 1, in which:
the phosphoric acid direct feed solution comprises a concentration by weight, xpd, of 20% to 80% $P_2O_5$, and in which
a flow rate, Qd, of the direct feed solution into the combustion chamber per power unit of the combustion chamber, is between 0 and 1500 kg/(h MW).

5. The process as claimed in claim 1, in which: the feed solution comprises a concentration by weight of at least 40% $P_2O_5$.

6. The process as claimed in claim 1, in which:
the feed solution comprises a concentration by weight of less than 40% $P_2O_5$, and in which a flow rate, Qd, of the direct feed solution is nonzero.

7. The process as claimed in claim 1, in which:
the mixing solution comprises a concentration by weight, xpm, of 15% to 80% of $P_2O_5$; and
a flow rate, Qm, of the mixing solution in the combustion chamber per power unit of the combustion chamber, is between 600 and 3000 kg/(h MW).

8. The process as claimed in claim 1, in which:
the polyphosphoric acid solution comprises a concentration by weight, xp3, of at least 76% of $P_2O_5$, and in which
the flow rate, Q3, of the polyphosphoric acid solution in the combustion chamber per power unit of the combustion chamber, is between 240 and 1500 kg/(h MW).

9. The process as claimed in claim 1, in which the feed stream and the recirculation stream are either:
mixed before they are introduced into the gas/acid contactor, in order to form a stream of a mixture of the feed solution of the contactor and of the recirculated enriched phosphoric acid solution; or
brought into contact after having been introduced separately into the gas/acid contactor, in order to form a stream of a mixture of the feed solution of the contactor and of the recirculated enriched phosphoric acid solution.

10. The process as claimed in claim 1, in which the direct feed stream and the spray solution stream are either:
mixed in order to form the mixing stream before being sprayed into the flame in the combustion chamber, or
sprayed separately into the combustion chamber in order to form the mixing stream in the flame or immediately before reaching the flame.

11. The process as claimed in claim 1, in which contact between the feed stream with flow rate by weight (Q0) of the contactor and the recirculation stream with flow rate by weight (Q2) and the combustion gases in stage (d) is carried out co-currentwise or countercurrentwise, by flowing from an upper part toward a lower part of the gas/acid contactor, and in which, during the contacting stage (d), the ratio (Qg1/(Q0+Q2)) between a flow rate by weight, Qg1, of the combustion gas introduced into the gas/acid contactor and a total flow rate by weight (Q0+Q2) of the contact feed stream and of the recirculation feed stream introduced into the gas/acid contactor is between 0.1% and 50%.

12. A device for the production of the polyphosphoric acid following a process as claimed in claim 1, comprising:
(A) the combustion chamber exhibiting:
an enriched phosphoric acid inlet in the combustion chamber, making possible the introduction at a flow rate of the enriched phosphoric acid solution in the sprayed form into a combustion unit,
an inlet for direct feeding into the combustion chamber or upstream of the enriched phosphoric acid inlet, making possible the introduction of the direct aqueous feed solution or of a mixture of the direct feed solution and of the enriched phosphoric acid solution in the sprayed form into the combustion unit,
the combustion unit being arranged in the upper part of the combustion chamber and being capable of forming a flame having a temperature of at least 1500° C. by combustion of a fuel, said combustion unit comprising:
a burner,
fluid connections between the burner a source of oxygen and, a source of fuel making it possible to feed the flame,
an outlet for the polyphosphoric acid from the combustion chamber in order to recover a liquid phase, and arranged downstream of the combustion unit, which is itself arranged downstream of the enriched phosphoric acid inlet,
an outlet for a discharge of the combustion gas resulting from the flame;
(B) the gas/acid contactor exhibiting:
a contact feed inlet connected to a source of the feed solution of the gas/acid contactor, making possible the introduction at a contact feed flow rate, Q0, of the feed solution of the gas/acid contactor,
an inlet for combustion gases making possible the introduction, into the gas/acid contactor, of the combustion gases at a flow rate, Qg1,
a recirculation inlet from the contact feed inlet, making possible the introduction of a recirculated enriched phosphoric acid solution at a recirculation flow rate, Q2,
at least one of the contact feed inlet or the recirculation inlet and the inlet for combustion gases being arranged in order to make possible, one of:
contact between the contact feed stream and the recirculation stream, in order to form a stream of a mixture of the feed solution of the gas/acid contactor and of the recirculated enriched phosphoric acid solution, or
contact of the mixture thus formed with the combustion gases, and one or more outlets for the enriched phosphoric acid solution;
(C) a combustion gas fluid connection with a linking end coupled to a discharge outlet of the combustion gases from the combustion chamber, and a second end coupled to the inlet for combustion gases into the gas/acid contactor;

(D) a first spray fluid connection linking an upstream end, coupled:
- to the one or more outlets for enriched phosphoric acid solution ($1pd$) of the gas/acid contactor, or
- to a branch point with a first fluid connection which is coupled to the outlet for the enriched phosphoric acid solution,
- to a downstream end coupled to the enriched phosphoric acid inlet into the combustion chamber;

characterized in that the device additionally comprises:

(E) a recirculation fluid connection linking an upstream end, coupled,
- to an outlet for recirculated enriched phosphoric acid of the gas/acid contactor, or
- to the branch point with a first fluid connection, and
- to a downstream end coupled to the recirculation inlet ($1pru$) of the gas/acid contactor or to a contact feed connection feeding the gas/acid contactor with feed solution for the gas/acid contactor; and (F) at least one of a pump, one or more valves, or a set of conduits that control and maintain a ratio, $Qp/(Qp+Q2)$, between a spray flow rate by weight, $Qp$, flowing in the spray fluid connection, and a total flow rate by weight $(Qp+Q2)$ defined as the sum of the spray flow rate by weight, $Qp$, and of a recirculation flow rate by weight, $Q2$, flowing in the recirculation fluid connection, at a value of less than 50%, and in which the ratio $Qp/(Qp+Q2)$ has a value of greater than 0.1%.

* * * * *